Figure 1:
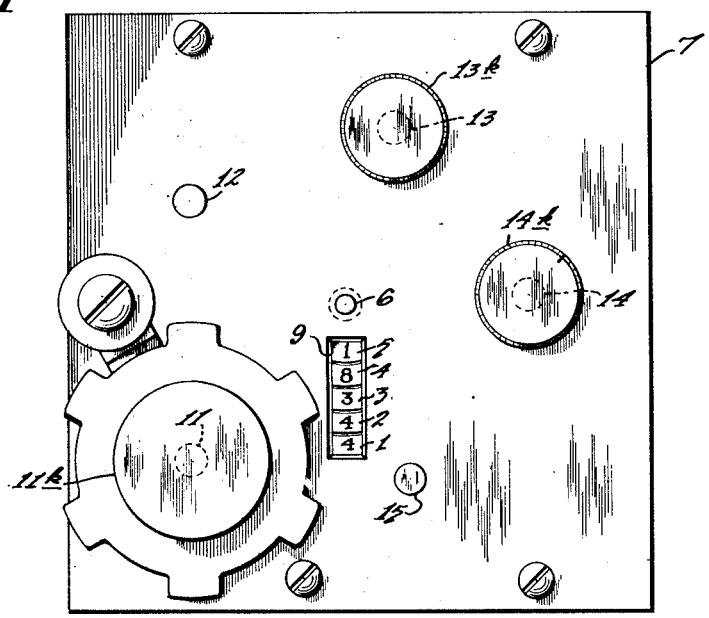

Oct. 14, 1952  A. L. CONSALVI ET AL  2,614,181
SWITCH REGISTER

Filed Dec. 24, 1948  2 SHEETS—SHEET 1

Inventors
ANTHONY L. CONSALVI,
GEORGE H. WEBBER &
HOWARD C. LAWRENCE, JR.
By
Morris A. Rabkin
Attorney Oct. 14, 1952 A. L. CONSALVI ET AL 2,614,181
SWITCH REGISTER
Filed Dec. 24, 1948 2 SHEETS—SHEET 2
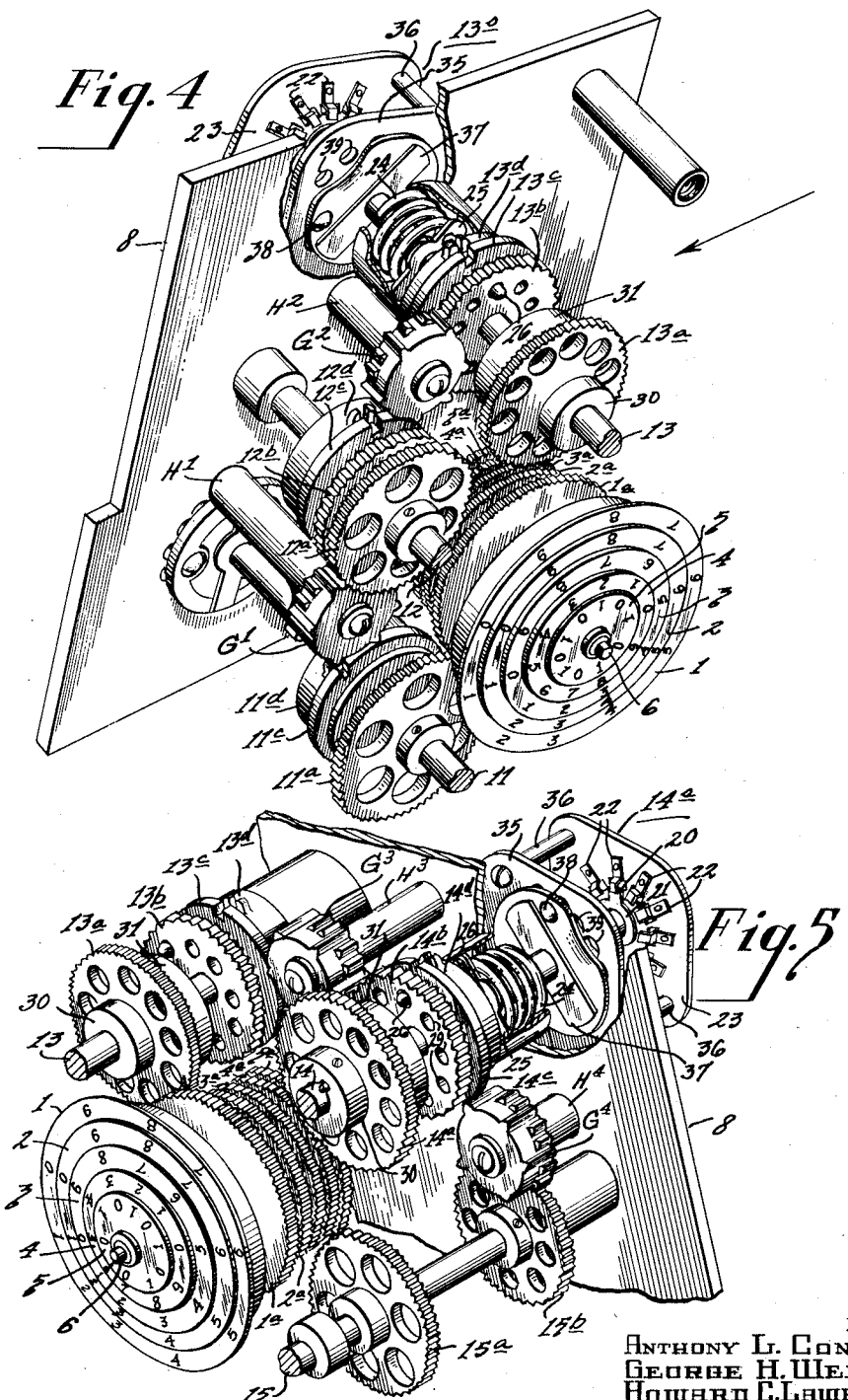
Inventors
ANTHONY L. CONSALVI,
GEORGE H. WEBBER &
HOWARD C. LAWRENCE, JR.
By
Attorney Patented Oct. 14, 1952

2,614,181

UNITED STATES PATENT OFFICE 2,614,181

SWITCH REGISTER

Anthony L. Consalvi, Philadelphia, George H. Webber, Conshohocken, Pa., and Howard C. Lawrence, Jr., Haddonfield, N. J., assignors to Radio Corporation of America, a corporation of Delaware Application December 24, 1948, Serial No. 67,152

11 Claims. (Cl. 200—18)

This invention relates to improvements in switch banks of the type wherein the switch shafts are normally connected (as through a Geneva movement) to be actuated successively in the order of their series, and has for its principal object to provide an apparatus of this general character which shall be suited especially for use in radio-navigation systems.

In "loran" and analogous (position-determining) systems it would be convenient to use two or more, small mechanical registers (one for each bank of switches in the circuits of the electronic counters) for recording the "received-time-difference" between two electrical pulses which are known to have left two separated radio transmitters at times differing by a known interval. Thus, one register could be used to record the time-difference between pulses received from, say, Nantucket and from Cape Sable and another register could be used to record the time difference between pulses received from say, Nantucket and Cape Hatteras. In this case the navigator could plot not only his line of position but could determine his position along the said line simply from the information on the two mechanical registers.

In one type of system with which the herein described switch register is adapted to be used, the pulses received from one of the transmitting stations is used to produce an indication on the screen of a cathode ray tube. A second indication on the same screen is produced by the pulses from the other transmitting station. The first indication assumes a fixed position on the screen while the position of the second indication is, through suitable electronic circuitry, variable. The variations in the circuit, which cause the movement of the second indication, are controlled through a series of manually operated switches. The switches are adjusted until the two indications are aligned or superimposed at which time the setting of the switches would be indicative of the time interval between the two series of pulses. For convenience in determining the setting of the various switches, they are connected to a set of dials or registers which may be calibrated in terms of micro-seconds.

In the foregoing example, if the time difference between pulses received from Nantucket and from Cape Sable, at a particular moment, is found to be 2500 microseconds, while the Cape Sable pulse is known to have been transmitted 3000 microseconds after that from Nantucket, the navigator knows (a) that he is farther from Nantucket and (b) that the difference from the two points is that traveled by a radio wave in the 500 microseconds recorded on the said register (i. e. about 93 miles). Now if another "fix" is to be taken say 20 minutes later (when the aircraft is perhaps 100 miles farther along on its journey) it is apparent that some means must be employed for changing the previously recorded 500 microsecond reading to a much higher numbered reading, e. g. say, 1000 or even 99,000. It is also apparent that since the desired new setting of the register and its switches must often be made with great rapidity it would be impractical to employ a registering device of the ordinary type, since in that case the desired setting could only be achieved by "cranking" the device through all of the intervening consecutive numbers. It has therefore previously been proposed to employ a registering mechanism having either differential gears or a clutch in the transfer mechanism between adjacent orders for the purpose of allowing independent adjustment of one of the orders as shown, by way of example, in U. S. Patents Chase, 1,011,156, Crumpton 1,349,049 and Heuser 1,179,358. Attempts to apply such differential or clutch mechanisms to the switch registers or "counters" of a radio-navigation system (wherein the operation of the numeral wheels, or their shafts, control the setting of a number of decade switches) have not proved entirely successful either because (a) the necessary use of quill shafts in the differential mechanism of the register makes it difficult to use the shafts for actuating the separate switches in the bank or (b) because the switch arms may, and frequently do, come to rest between the switch contacts and interrupt the electrical continuity of the system, or (c) because the adjusting operation involves a troublesome manual unmeshing and re-meshing of gears.

Accordingly, another and specific object of the present invention is to provide a combined switch-bank, control mechanism and register which shall be free from the above-mentioned and other less apparent disadvantages of analogous prior-art equipments.

Figure 2:
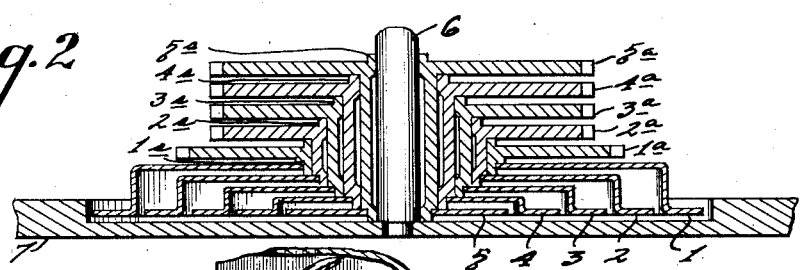

The invention will be described with particularity in connection with the accompanying drawings, wherein:

Fig. 1 is a front elevation showing the control panel of a cabinet containing the switch unit and register of the invention, Fig. 2 is a sectional view showing the dial of the register and the driven gears of the dial.

Figure 3:
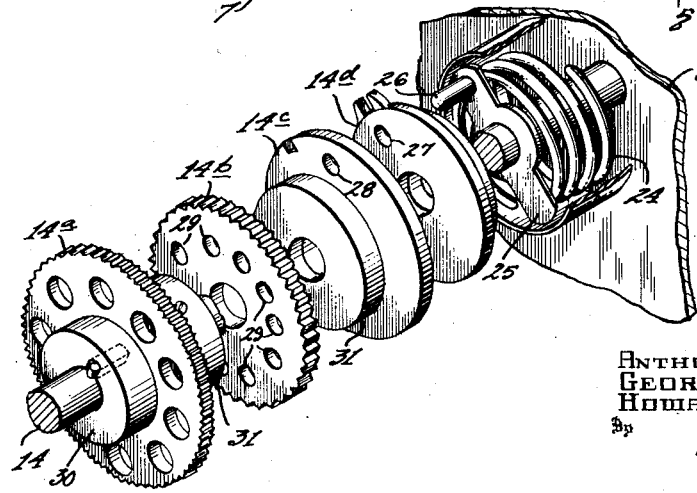

Fig. 3 is an exploded view in perspective showing a clutch and detent mechanism for controlling the actuation of the switches, Fig. 4 is a view in perspective of the mechanism with its cover and knobs removed but showing only three of the five driving shafts of the unit, Fig. 5 is a similar view—but looking in the direction of the arrows in Fig. 4 and showing the two control shafts which were omitted from Fig. 4.

In the drawings, reference numerals 1 to 5 inclusive designate the separate ones of a series of five number-wheels which are concentrically mounted for rotation in a common plane about the axis of a central shaft or bearing 6. This shaft 6 is supported at its opposite ends upon the front and rear panels 7 and 8 of the register, and there is a sight-opening 9 in the front panel through which the numbers on each wheel are presented to view. The number wheels 1–5 are secured, respectively, to the outer ends of a nest of concentrically arranged rotatable sleeves 1s–5s (see Fig. 2) which terminate in a similar number of parallelly arranged spur gears 1a, 2a etc. The number-wheels are driven through their spur gears 1a etc. by complementary driving gears 11a–15a secured, respectively, to a series of five driving shafts 11 to 15, inclusive, which are arranged in spaced parallel array about the axis of the dial shaft 6 between the front and rear panels 7 and 8. (Shaft 14, shown in Fig. 5, has been omitted, in the interests of simplicity, from Fig. 4. Similarly, shafts 11 and 12, shown in Fig. 4, have been omitted from Fig. 5.)

The drive shafts 11 to 15, and hence the numeral wheels 1 to 5, are normally coupled together for serial operation, by a Geneva movement. Thus, each drive shaft is provided, in addition to its dial gear (11a–15a), with a full-toothed gear $b$, a notched spacing disc $c$ and a two-toothed disc $d$, (in the drawings, these letter designations are preceded by the numerical designations of the appropriately associated shaft, i. e. 11, 12, 13 etc.), the full-toothed gear being omitted from the first shaft 11 since that shaft is driven directly, as by a pulley or knob 11k (Fig. 1) on the front end thereof. The two-toothed disc $d$ on the inner end of each shaft 11–14 drives the next adjacent shaft in the series through a Geneva pinion $G^1$, $G^2$, $G^3$, $G^4$; each pinion being mounted on its own stub shaft $H^1$, $H^2$, $H^3$, $H^4$ and arranged to mesh with the full-toothed gear $b$ on the next higher numbered shaft.

The mechanism thus far described is a "register" of more or less conventional construction. In accordance with the present invention each of the rotatable driving shafts 11–15 serves to control the setting of individual ones of a bank of multi-position switches (exemplified by the decade switches 13s, 14s, Figs. 4 and 5) and the said driving shafts, or some of them (exemplified by the shafts 13 and 14) are arranged in the manner hereinafter described to permit a selected switch to be moved rapidly and accurately to a desired setting without necessarily changing the setting of the other switches in the bank.

The intermediate switch shafts 13 and 14 of the series, and the parts thereon, are of duplicate construction, hence a description of shaft 14, (as shown in Figs. 3 and 5) will serve as a description of both 14 and 13. The said shaft 14 is mounted to permit of both rotational and axial movement and has a switch contact arm 20 flexibly or slidably mounted thereon adjacent to its inner end, as indicated at 21, for rotation in the plane of the circumferentially spaced decade contacts 22 on the stationary base 23 of the switch so that the said rotatable arm 20 may be moved from one contact to the next irrespective of the axial position of the said shaft. The axially movable shaft 14 is normally biased to its forward position by a coil spring 24 which bears against the rear panel 8 and exerts its force against a crank arm 25 which is fixedly secured to the shaft. The crank 25 carries a clutch element in the form of a pin 26 on one of its outer extremities. When the shaft is in its normal (forwardly-biased) position the pin 26 extends through the hole 27 in the two-toothed gear $b$, through the hole 28 in the spacing disc $c$, and also through one of ten circumferentially spaced holes 29 in the rear or "clutch face" of the full-toothed gear $b$. Thus, when the shafts 13 and 14 are in their normal position, torque applied to the driving shaft 11 will be transmitted, in order, to the other shafts 12 to 15, and the numeral wheels 1 to 5 inclusive will be caused to turn serially, i. e. in the order of their numbers. On the other hand, when the shafts 13 and 14, or one of them, is pushed in against the force of its biasing spring 24 the pin 26 will be withdrawn from the full-toothed gear $b$ but remains within both the two-toothed gear $d$ and notched spacing disc $c$; hence that shaft (13 or 14) may be rotated by turning its knob (13k or 14k Fig. 1) to indicate any desired number (of its order), and of all higher orders on the dial. It should be noted that the prescribed inward movement of the shafts 13 or 14 does not throw the driving gears (13a or 14a) and driven gears (3a or 4a) for the numeral wheels (3 or 4) out of mesh, since the said driving gears (13a or 14a) are mounted each on a splined collar 30 within which the shaft moves. Nor is either of the driven gears 13b or 14b thrown out of mesh with its driving pinion $G^2$ or $G^3$ since the said gear, though not secured to its shaft (13 or 14), except through a clutch pin 26, is maintained in position by suitable spacers 31 on the said shaft.

The holes 29 in the driven gear $b$ correspond in number and distribution to the number (in this case, ten) and distribution of the contacts 22 on the stationary base 23 of the switch. Thus, when the clutch pin 26 is within a given hole in the driven gear $b$ the switch will always be "in circuit" through the contact which is in register with that hole. When the pin 26 is disengaged by pushing the shaft inwardly against the force of its biasing spring 24 and then rotated there is the possibility that upon completion of the turning movement the pin may come to rest on the rear face of the driven gear $b$, i. e. between two of the (ten) holes (29) in the said gear. This possibility is obviated, in accordance with the invention, by the provision of the novel detent mechanism shown applied to the switch shafts 13 and 14 in Figs. 4 and 5 respectively.

The detent mechanism as shown in Figs. 4 and 5 comprises an apertured wafer-like insulator 35 fixedly mounted on the rear panel 8 of the cabinet, (as by the same studs 36 that support the base 23 of the decade switch 20, 23) and a radial arm 37 fixed upon the shaft (13 or 14) so that it rotates and is subject to the same axial movements as the said shaft. This arm 37 carries one or more preferably ball-shape pawls or clicks 38 resiliently or loosely seated on its rear surface, and the adjacent face of the wafer-like plate 35 is provided with ten circumferentially arranged apertures or cavities 39 within which the said click or clicks are adapted to dwell, successively, when the shaft is pushed in and subjected to rotation. Each aperture or cavity 39 in the plate 35 is in alignment with one of the switch contacts 22 and with one of the holes 29 in the driven gear b, when that gear is at rest. When the shaft is pushed inwardly (so that the switch and the number wheel which are associated therewith may be turned rapidly to a new setting) the arm 37 will be moved toward the apertured plate 35 and the click 38 on the said arm will be seated in one of the cavities 39. As the now inwardly pressed shaft is turned, the pawl or click 38 moves from cavity to cavity and the operator is advised by his sense of touch when the click is in or out of a cavity. Since the clutch pin 26, like the click 38, moves with the shaft and since the apertured driven gear b is at rest when the shaft is pushed in, it is apparent that when the click comes to rest within a given cavity then the clutch pin 26 will be aligned with one of the holes in the driven gear and will enter the said hole when the shaft is returned to its normal (outward) position.

From the foregoing it will be apparent that the present invention provides a novel switch-adjusting mechanism and one suited especially for use in radio-navigation and other systems wherein required changes in the settings of a plurality of multi-contact switches must be made in a rapid, accurate and "fumble-proof" manner.

What is claimed is:

1. In combination, a series of multi-contact switches and a plurality of shafts connected thereto for controlling the setting of said switches, a Geneva movement having driving and driven gear elements normally connected in torque-transfer relation between said shafts for actuating said switches successively in the order of their series, and a clutch having complementary clutch elements normally connected between adjacent ones of said shafts and adapted to be disconnected to permit actuation of a given switch independently of the setting of the switches of a lower order in said series.

2. The invention as set forth in claim 1 and wherein one of said complementary clutch elements comprises the driven gear for the control shaft of said given switch.

3. The invention as set forth in claim 1 and wherein said Geneva movement comprises the actuating mechanism of a register for indicating the setting of said multi-contact switches.

4. A switch mechanism comprising, a shaft supported for axial movement and for rotation about its axis and having a switch contact arm slidably mounted thereon for rotation in a single plane irrespective of the axial position of said shaft, a plurality of switch contacts fixedly mounted in circumferentially spaced array in said plane about the axis of said shaft in a position to be selectively engaged by said contact arm upon rotation of said shaft, a driven gear mounted to permit of independent rotation on said shaft and provided with a clutch face having apertures therein corresponding in number and position to said switch contacts, a male clutch element fixedly mounted on said shaft in a position to be entered into one of said clutch face apertures when said switch arm is in contact with one of said switch contacts, an index plate fixedly mounted about said shaft parallel to said plane and provided with notches corresponding in position and number to said switch contacts, and a pawl secured to said shaft in a position to engage said notched index plate upon axial movement of said shaft to a position whereat said driven gear is disengaged from said shaft.

5. The invention as set forth in claim 4 and wherein spring means are provided for biasing said shaft to a position whereat said driven gear is connected in driving relation to said shaft through said male clutch element.

6. The invention as set forth in claim 4 and wherein means are provided for maintaining said driven gear against rotation when said male clutch element is out of engagement with the clutch face of said gear.

7. The invention as set forth in claim 6 and wherein said rotation-preventing means for said driven gear comprises an idle driving gear.

8. In combination, a series of multi-contact switches, a corresponding number of shafts operatively connected to said switches respectively, said shafts being serially connected by a gear train which provides successively higher orders of driving and driven relationships between said shafts, said gear train including Geneva movement, and a normally engaged clutch mechanism on a certain selected one of said shafts, said clutch mechanism being operative to disconnect said selected shaft from the Geneva movement normally connecting said selected shaft to a shaft of lower order in said series whereby the switch operated by said selected shaft may be actuated independently of the switches operated by shafts of a lower order in said series, the gears in said train remaining in meshed relation regardless of the operation of said clutch mechanism.

9. The invention as set forth in claim 9 characterized by the addition of a register, and characterized further in that said shafts are geared to said register for indicating the setting of said multi-contact switches.

10. In combination, a series of multi-contact switches, a corresponding number of shafts each one of which is operatively connected to one of said switches, a gear train serially connecting said shafts, said gear train providing successively higher orders of driving and driven relationships between said shafts, said gear train including a Geneva movement, said Geneva movement normally connecting a certain selected one of said shafts to a shaft of lower order in said series and a normally engaged clutch mechanism on said selected shaft, said clutch mechanism being operative to disconnect said selected shaft from said Geneva movement whereby the switch operated by said selected shaft may be actuated independently of the switches operated by shafts of a lower order in said series, the gears in said train remaining in meshed relation regardless of the operation of said clutch mechanism, said selected shaft being mounted for axial movement, said clutch mechanism comprising a clutch pin fixedly attached to said selected shaft, a gear included in said train mounted on said selected shaft to permit of axial movement and independent rotation of said selected shaft with respect to said gear, said gear having apertures therein adapted to receive said clutch pin, said apertures corresponding in number and position to the several contact positions of the switch operated by said selected shaft, and spring bias means normally biasing said clutch pin into one of said apertures whereby said gear is caused to rotate simultaneously with said selected shaft.

11. The invention as set forth in claim 10 characterized by the addition of an indexing device comprising a detent plate fixedly mounted about but independent of said selected shaft, said plate having a plurality of notches corresponding in number and position to said apertures, and a pawl secured to said selected shaft in a position to engage said notched plate upon axial movement of said selected shaft to a position whereat said clutch pin disengages said gear, said indexing device being adapted to align said clutch pin with any one of said apertures.

ANTHONY L. CONSALVI.
GEORGE H. WEBBER.
HOWARD C. LAWRENCE, Jr.

REFERENCES CITED

The following references are of record in the file of this patent:

UNITED STATES PATENTS

| Number | Name | Date |
|---|---|---|
| 627,376 | Von Zwiegbergk | June 20, 1899 |
| 2,484,576 | Minneci | Oct. 11, 1949 |

FOREIGN PATENTS

| Number | Country | Date |
|---|---|---|
| 14,590 | Great Britain | June 26, 1906 |